United States Patent
Jung et al.

(12) 
(10) Patent No.: US 6,489,432 B2
(45) Date of Patent: Dec. 3, 2002

(54) ORGANIC ANTI-REFLECTIVE COATING POLYMER AND PREPARATION THEREOF

(75) Inventors: Min-Ho Jung, Gyunggi-do (KR);
Sung-Eun Hong, Gyunggi-do (KR);
Jae-Chang Jung, Gyunggi-do (KR);
Geun-Su Lee, Gyunggi-do (KR);
Ki-Ho Baik, Gyunggi-do (KR)

(73) Assignee: Hyundai Electronics Industries Co., Ltd. (KR)

( * ) Notice: Subject to any disclaimer, the term of this patent is extended or adjusted under 35 U.S.C. 154(b) by 0 days.

(21) Appl. No.: 09/747,362

(22) Filed: Dec. 22, 2000

(65) Prior Publication Data

US 2001/0049429 A1 Dec. 6, 2001

(30) Foreign Application Priority Data

Dec. 23, 1999 (KR) ............................. 99-61343

(51) Int. Cl.$^7$ .................................. C08G 2/24
(52) U.S. Cl. ...................... 528/230; 528/247; 528/495; 525/398; 427/372.2
(58) Field of Search ................. 528/230, 495, 528/247; 525/398; 427/372.2

(56) References Cited

U.S. PATENT DOCUMENTS

| | | | |
|---|---|---|---|
| 4,424,270 A | 1/1984 | Erdmann et al. | 430/166 |
| 4,822,718 A | 4/1989 | Latham et al. | 430/271 |
| 5,525,457 A | 6/1996 | Nemoto et al. | 430/325 |
| 5,674,648 A | 10/1997 | Brewer et al. | 430/18 |

FOREIGN PATENT DOCUMENTS

| | | |
|---|---|---|
| EP | 0 277 038 A2 | 7/1988 |
| EP | 0 277 038 A3 | 8/1988 |
| EP | 0 823 661 A1 | 2/1998 |
| WO | WO00/01752 | 1/2000 |

*Primary Examiner*—Duc Truong
(74) *Attorney, Agent, or Firm*—Townsend and Townsend and Crew LLP

(57) ABSTRACT

The present invention provides a polymer that can be used as an anti-refelctive coating (ARC) polymer, an ARC composition comprising the same, methods for producing the same, and methods for using the same. The polymer of the present invention is particularly useful in a submicrolithographic process, for example, using KrF (248 nm), ArF (193 nm), or $F_2$ (157 nm) laser as a light source. The polymer of the present invention comprises a chromophore that is capable of absorbing light at the wavelengths used in a submicrolithographic process. Thus, the ARC of the present invention significantly reduces or prevents back reflection of light and the problem of the CD alteration caused by the diffracted and/or reflected light. The ARC of the present invention also significantly reduces or eliminates the standing wave effect and reflective notching. Therefore, the polymer of the present invention can be used to produce a stable ultrafine pattern that is suitable in manufacturing of 64M, 256M, 1G, 4G and 16G DRAM semiconductor devices. Moreover, the ARC of the present invention significantly improves the production yield of such semiconductor devices.

21 Claims, No Drawings

ORGANIC ANTI-REFLECTIVE COATING POLYMER AND PREPARATION THEREOF

BACKGROUND OF THE INVENTION

1. Field of the Invention

The present invention relates to an anti-reflective polymer that is useful in a submicrolithographic process, a composition comprising the polymer, and a method for preparing the same. In particular, the present invention relates to a polymer that can be used in an anti-reflective coating layer to reduce or prevent back reflection of light and/or to eliminate the standing waves in the photoresist layer during a submicrolithographic process. The present invention also relates to a composition comprising the polymer, and a method for using the same.

2. Description of the Prior Art

In most submicrolithographic processes standing waves and/or reflective notching of the waves typically occur due to the optical properties of the lower layer coated on a substrate and/or due to changes in the thickness of a photosensitive (i.e., photoresist) film applied thereon. In addition, typical submicrolithographic processes suffer from a problem of CD (critical dimension) alteration caused by diffracted and/or reflected light from the lower layer.

One possible solution is to apply an anti-reflective coating (i.e., ARC) between the substrate and the photosensitive film. Useful ARCs have a high absorbance of the light wavelengths that are used in submicrolithographic processes. ARCs can be an inorganic an organic material, and they are generally classified as "absorptive" or "interfering" depending on the mechanism. For a microlithographic process using I-line (365 nm wavelength) radiation, inorganic anti-reflective films are generally used. Typically, TiN or amorphous carbon (amorphous-C) materials are used for an absorptive ARC and SiON materials are typically used for an interfering ARC.

SiON-based anti-reflective films have also been adapted for submicrolithographic processes that use a KrF light source. Recently, use of an organic compound as ARC has been investigated. It is generally believed that an organic compound based ARCs are particularly useful in submicrolithographic processes, in particular those using an ArF light source.

In order to be useful as an ARC, an organic compound needs to have many diverse and desirable physical properties. For example, a cured ARC should not be soluble in solvents because dissolution of the organic ARC can cause the photoresist composition layer to peel-off in a lithographic process. One method for reducing the solubility of cured ARC is to include cross-linking moieties such that when cured the ARC becomes cross-linked and becomes insoluble in most solvents used in lithographic processes. In addition, there should be minimum amount of migration (i.e., diffusion), if at all, of materials, such as acids and/or amines, to and from the ARC. If acids migrate from the ARC to an unexposed area of the positive photoresist film, the photosensitive pattern is undercut. If bases, such as amines, diffuse from the ARC to an unexposed area of the positive photoresist film a footing phenomenon occurs. Moreover, ARC should have a faster etching rate than the upper photosensitive (i.e., photoresist) film to allow the etching process to be conducted smoothly with the photosensitive film serving as a mask. Preferably, an organic ARC should be as thin as possible and have an excellent light reflection prevention property.

While a variety of ARC materials are currently available, none of these materials is useful in ArF laser submicrolithographic processes. In the absence of an ARC, the irradiated light penetrates into the photoresist film and is back reflected or scattered from its lower layers or the surface of the substrate (e.g., semiconductor chip), which affects the resolution and/or the formation of a photoresist pattern.

Therefore, there is a need for an ARC material which have a high absorbance of the wavelengths used in submicrolithographic processes.

SUMMARY OF THE INVENTION

It is an object of the present invention to provide an organic polymer that can be used as an ARC material in ArF laser (193 nm) or KrF laser (248 nm) submicrolithographic processes.

It is another object of the present invention to provide a method for preparing an organic polymer that reduces or prevents diffusion and/or light reflection in submicrolithographic processes.

It is a further object of the present invention to provide an ARC composition comprising such an organic diffusion/reflection preventing or reducing polymer and a method for producing the same.

It is a still further object of the present invention to provide a method for producing a photoresist pattern using ArF laser submicrolithographic processes with reduced standing wave effect.

It is yet another object of the present invention to provide a semiconductor device which is produced using the ARC composition in a submicrolithographic process.

DETAILED DESCRIPTION OF THE INVENTION

One aspect of the present invention provides an acrylate polymer, an ARC composition comprising the same, and a method for using the same. In one particular embodiment, the polymer of the present invention comprises a chromophore which has a high absorbance of light wavelengths of 193 nm and 248 nm.

ARC compositions of the present invention can comprise a mixture polymers which include cross-linking moieties such that the polymers become cross-linked when heated (i.e., cured or "hard baked"). Cross-linking moieties can comprise an alcohol group and other functional group that is capable of reacting with the alcohol group to form a cross-linkage. It is believed that cross-linking of the polymer significantly improves the adhesiveness and the dissolution properties of ARC compositions.

Uncured polymers of the present invention are soluble in most hydrocarbon solvents; however, cured polymers are substantially insoluble in most solvents. Thus, polymers of the present invention can be easily coated onto a substrate and are capable of preventing undercutting and footing problems that can occur during a photoresist pattern formation process on photosensitive materials (i.e., photoresist compositions). Moreover, ARCs of the present invention have a higher etching rate than conventional photosensitive films resulting in an improved etching ratio between ARCs and photosensitive films, i.e., higher etching selectivity.

One embodiment of the present invention provides an ARC polymer selected from the group consisting of a polymer of the formula:

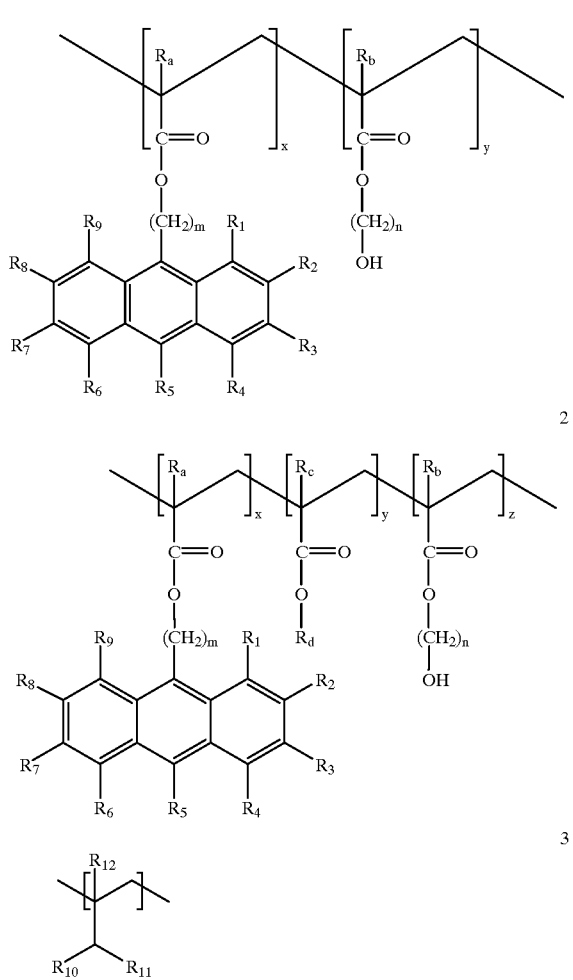

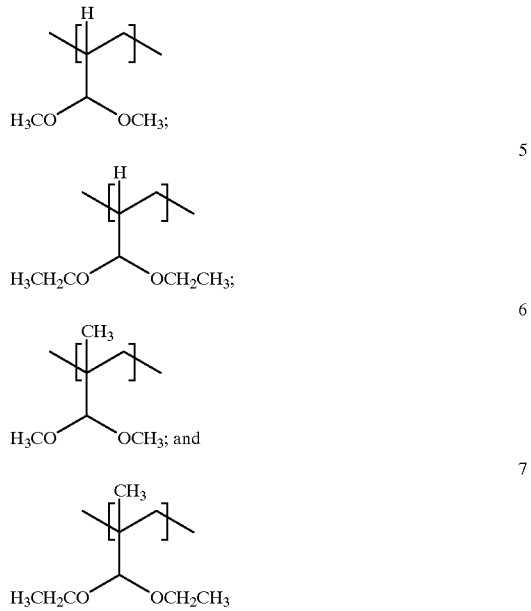

Polymers of Formulas 4 to 7 can be cured by contacting with an alcohol-containing compound in the presence of an acid.

Another aspect of the present invention provides a method for producing polymers disclosed above.

Polymers of Formula 1 can be produced by polymerizing a mixture of monomers comprising a 9-anthracenealkylacrylate monomer of the formula:

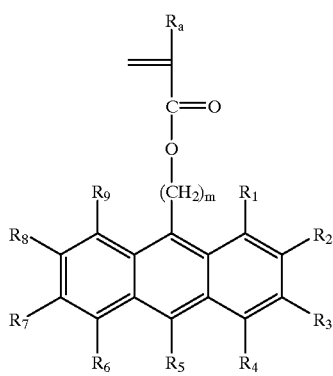

and a hydroxyalkylacrylate monomer of the formula:

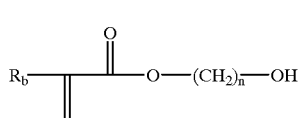

wherein each of $R_{12}$, $R_a$, $R_b$, and $R_c$ is independently hydrogen or optionally substituted $C_1-C_{10}$ alkyl, preferably hydrogen or methyl;

each of $R_1$ to $R_9$ is independently hydrogen, optionally substituted $C_1-C_5$ alkyl, or optionally substituted $C_1-C_5$ alkoxyalkyl;

$R_d$, $R_{10}$ and $R_{11}$ are independently optionally substituted $C_1-C_{10}$ alkyl;

x, y and z are mole fractions, each of which is independently in the range of from about 0.01 to about 0.99;

each of m and n is independently an integer of 1 to 5.

Alkyl groups according to the present invention are aliphatic hydrocarbons which can be straight or branched chain groups. Alkyl groups optionally can be substituted with one or more substituents, such as a halogen, alkenyl, alkynyl, aryl, hydroxy, amino, thio, alkoxy, carboxy, oxo or cycloalkyl. There may be optionally inserted along the alkyl group one or more oxygen, sulfur or substituted or unsubstituted nitrogen atoms. Exemplary alkyl groups include methyl, ethyl, i-propyl, n-butyl, t-butyl, fluoromethyl, difluoromethyl, trifluoromethyl, chloromethyl, trichloromethyl, and pentafluoroethyl.

Particularly useful polymers of Formula 3 include the following polymers:

under conditions sufficient to produce the polymer of Formula 1, where $R_a$, $R_b$, $R_1$ to $R_9$, and n are those defined above. Each monomer in the mixture has a mole fraction ranging from 0.01 to 0.99.

Polymers of Formula 2 can be produced by polymerizing a mixture of monomers comprising a 9-anthracenealkyl acrylate monomer of Formula IA above, a hydroxy alkylacrylate monomer of Formula IB above, and an alkylacrylate monomer of the formula:

IC

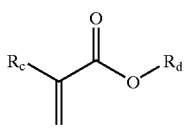

under conditions sufficient to produce the polymer of Formula 2, where $R_c$ and $R_d$ are those defined above. Each monomer in the mixture has a mole fraction ranging from 0.01 to 0.99.

The hydroxy alkylacrylate monomer of Formula IB and the alkylacrylate monomer of Formula IC are commercially available or can be readily prepared by those skilled in the art.

Polymers of Formula 3 can be produce by polymerizing an acrolein monomer of the formula:

ID

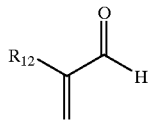

under conditions sufficient to produce a poly(acrolein) polymer of the formula:

IE

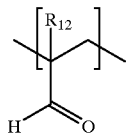

and reacting the poly(acrolein) polymer of Formula IE with an alcohol under conditions sufficient to produce the poly(acetal) polymer of Formula 3. The alcohol can be a mixture of different alcohols (e.g., $R_{10}$—OH and $R_{11}$—OH, where $R_{10}$ and $R_{11}$ are those defined above) or a homogeneous alcohol system (i.e., only one type of alcohol is present). For example, a solution of (meth)acrolein in an organic solvent is polymerized at 60–70° C. for 4–6 hours under vacuum in the presence of a polymerization initiator, after which the resulting polymeric product is reacted with $C_1$–$C_{10}$ alkyl alcohol at room temperature for 20–30 hours in the presence of an acid catalyst, e.g., trifluoromethylsulfonic acid. Examples useful alcohols include $C_1$–$C_{10}$ alkyl alcohols such as methanol, ethanol, propanol, butanol, pentanol, hexanol, heptanol, octanol, nonanol, decanol, and isomers thereof. In particular, methanol and ethanol are preferred.

The polymerization reactions disclosed above can include a polymerization initiator. Suitable polymerization initiators are well known to one of ordinary skill in the art including polymerization initiators that are used in conventional radical polymerization reactions such as 2,2-azobisisobutyronitrile (AIBN), benzoylperoxide, acetylperoxide, laurylperoxide, t-butylperacetate, t-butylhydroperoxide, and di-t-butylperoxide.

The polymerization reactions disclosed above can also include a polymerization solvent. Suitable polymerization solvents are well known to one of ordinary skill in the art. Exemplary polymerization solvents include organic solvents that are used in conventional polymerization reaction. Preferably, the polymerization solvent is selected from the group consisting of tetrahydrofuran (THF), cyclohexanone, dimethylformamide, dimethylsulfoxide, dioxane, methylethyl ketone, benzene, toluene, xylene and mixtures thereof.

Another aspect of the present invention provides an ARC composition comprising a cross-linked polymer produced from cross-linking a polymer of Formula 3 with a polymer of Formula 1 or 2, or mixtures thereof. The cross-linked polymer can be produced by admixing a polymer of Formula 3 and a polymer of Formula 1 or 2, or mixtures thereof under conditions sufficient to produce the cross-linked polymer. Typically, this cross-linking reaction is conducted in a conventional organic solvent. Suitable organic solvents for a cross-linking reaction are well known to one skilled in the art and include, but are not limited to, ethyl 3-ethoxypropionate, methyl 3-methoxypropionate, cyclohexanone, and propylene glycol methyletheracetate. The amount of solvent used is preferably from about 200 to about 5,000% by weight of the total weight of the polymer.

The ARC composition of the present invention can also include one or more anthracene derivative additives. Exemplary anthracene derivative additives include, but are not limited to, anthracene, 9-anthracenemethanol, 9-anthracenecarbonitrile, 9-anthracenecarboxylic acid, dithranol, 1,2,10-anthracenetriol, anthraflavonic acid, 9-anthraldehydeoxime, 9-anthraldehyde, 2-amino-7-methyl-5-oxo-5H-[1]benzopyrono[2,3-b]benzopyridine-3-carbonitrile, 1-aminoanthraquinone, anthraquinone-2-carboxylic acid, 1,5-dihydroxyanthraquinone, anthrone, 9-anthryltrifluoromethyl ketone, 9-alkylanthracene derivatives of the formula:

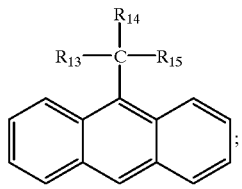

carboxylanthracene derivatives of the formula:

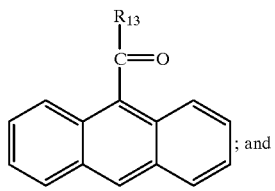

and carboxylanthracene derivatives of the formula:

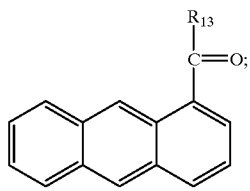

where each of $R_{13}$, $R_{14}$, and $R_{15}$ is independently hydrogen, hydroxy, optionally substituted $C_1$–$C_5$ alkyl, or optionally substituted $C_1$–$C_5$ alkoxyalkyl.

Another aspect of the present invention provides a method for producing an ARC coated substrate. In one particular embodiment, a substrate (e.g., wafter) is coated with an anti-reflective coating composition comprising a mixture of polymers. The mixture of polymers comprises a polymer of Formula 3 and a polymer of Formula 1 or 2, or mixtures thereof. The mixture of polymers can be dissolved in an organic solvent and filtered prior to being coated. The mixture of polymers can also include one or more additives described above. The coated substrate is then heated (i.e., hard-baked) to produce the ARC coated substrate. Preferably the coated substrate is heated to temperature in the range of from about 100 to about 300° C. for a period of from about 10 sec to about 1,000 sec. Heating the substrate causes cross-linking of the polymers to produce a thin film of ARC coating.

It has been found by the present inventors that the ARCs of the present invention exhibit high performance in sub-microlithographic processes, in particular using KrF (248 nm), ArF (193 nm) and $F_2$ (157 nm) lasers as a light source.

Additional objects, advantages, and novel features of this invention will become apparent to those skilled in the art upon examination of the following examples thereof, which are not intended to be limiting.

EXAMPLE I

Synthesis of poly[9-anthracenemethylacrylate-(2-hydroxyethylacrylate)] binary copolymer Synthesis of 9-anthracenemethylacrylate To a solution of tetrahydrofuran was added 0.5 mole of 9-anthracenemethanol, 0.5 mole of pyridine, and 0.5 mole of acryloyl chloride. After completion of the reaction, the product was filtered, dissolved in ethyl acetate, washed with water, and concentrated by distillation under vacuum to give 9-anthracenemethylacrylate of Formula 11. Yield 84%.

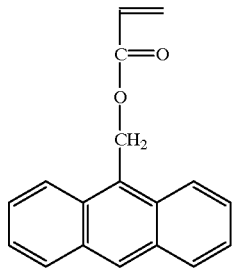

11

Synthesis of poly[9-anthracenemethylacrylate/2-hydroxyethylacrylate]copolymer

To a 500 ml round-bottom flask was added 0.5 mole of 9-anthracenemethylacrylate, 0.5 mole of 2-hydroxyethylacrylate, 300 g of tetrahydrofuran (THF), and 0.1–3 g of 2,2'-azobisisobutyronitrile (AIBN). The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylacrylate/2-hydroxyethylacrylate] polymer of the Formula 12. Yield: 83%.

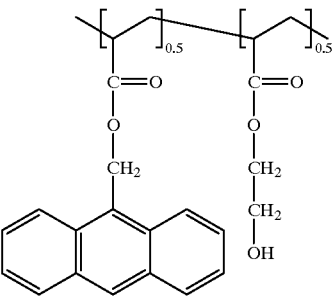

12

EXAMPLE II

Synthesis of poly[9-anthracenemethylacrylate/3-hydroxypropylacrylate] copolymer

To a 500 ml round-bottom flask was added 0.5 mole of 9-anthracenemethylacrylate (prepared according to the procedure of Example I), 0.5 mole of 3-hydroxypropylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to produce poly[9-anthracenemethylacrylate/3-hydroxypropylacrylate] copolymer of the Formula 13. Yield: 82%.

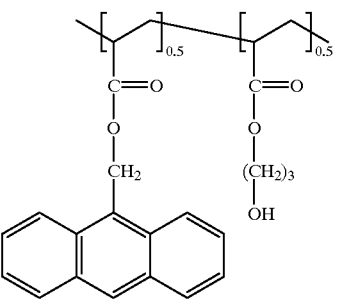

13

EXAMPLE III

Synthesis of poly[9-anthracenemethylacrylate/4-hydroxybutylacrylate] copolymer

To a 500 ml round-bottom flask was added 0.5 mole of 9-anthracenemethylacrylate, 0.5 mole of 4-hydroxybutylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylacrylate/4-hydroxybutylacrylate] copolymer of Formula 14. Yield: 81%.

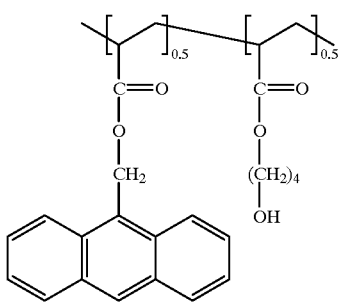

14

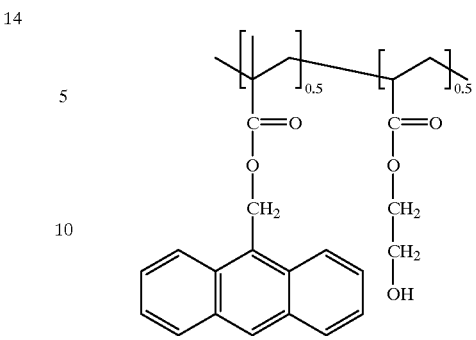

16

EXAMPLE IV

Synthesis of poly[9-anthracenemethylmethacrylate/
2-hydroxyethylacrylate] copolymer Synthesis of 9-anthracenemethylmethacrylate To a solution of THF was added 0.5 mole of 9-anthracene methanol, 0.5 mole of pyridine, and 0.5 mole of methacryloyl chloride. After completion of the reaction, the product was filtered, dissolved in ethyl acetate, washed with water, and concentrated by distillation under vacuum to afford 9-anthracenemethylmethacrylate of Formula 15. Yield: 83%.

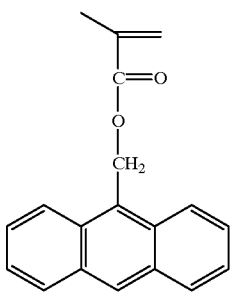

15

Synthesis of poly[9-anthracenemethylmethacrylate/
2-hydroxyethylacrylate] copolymer To a 500 ml round-bottom flask was added 0.5 mole of 9-anthracenemethylmethacrylate, 0.5 mole of 2-hydroxyethylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylmethacrylate/2-hydroxyethylacrylate] copolymer of Formula 16. Yield: 79%.

EXAMPLE V

Synthesis of poly[9-anthracenemethylmethacrylate/
3-hydroxypropylacrylate] copolymer To a 500 ml round-bottom flask was added 0.5 mole of 9-anthracenemethylmethacrylate, 0.5 mole of 3-hydroxypropylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylmethacrylate/3-hydroxypropylacrylate] copolymer of Formula 17. Yield: 81%.

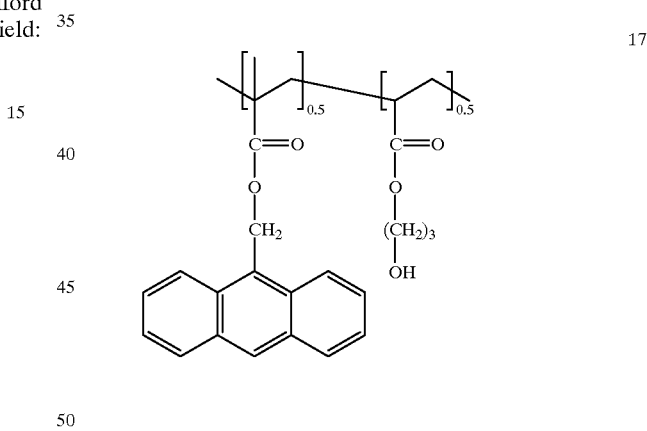

17

EXAMPLE VI

Synthesis of poly[9-anthracenemethylmethacrylate/
4-hydroxybutylacrylate] copolymer To a 500 ml round-bottom flask was added 0.5 mole of 9-anthracenemethylmethacrylate, 0.5 mole of 4-hydroxybutylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylmethacrylate/4-hydroxybutylacrylate] copolymer of Formula 18. Yield: 81%.

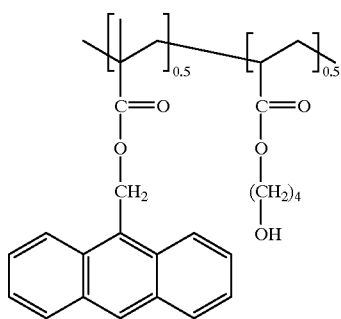

18

EXAMPLE VII

Synthesis of poly[9-anthracenemethylacrylate/2-hydroxyethylacrylate/methylmethacrylate] copolymer To a 500 ml round-bottom flask was added 0.3 mole of 9-anthracenemethylacrylate, 0.5 mole of 2-hydroxyethylacrylate, 0.2 mole of methylmethacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylacrylate/2-hydroxyethylacrylate/methylmethacrylate] copolymer of Formula 19. Yield: 80%.

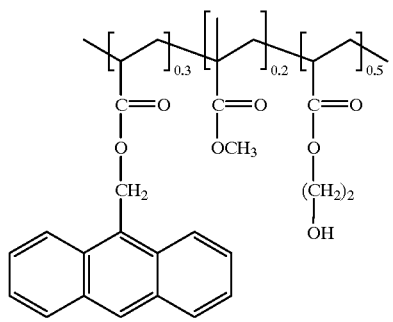

19

EXAMPLE VIII

Synthesis of poly[9-anthracenemethylacrylate/3-hydroxypropylacrylate/methylmethacrylate] copolymer To a 500 ml round-bottom flask was added 0.3 mole of 9-anthracenemethylacrylate, 0.5 mole of 3-hydroxypropylacrylate, 0.2 mole of methylmethacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylacrylate/3-hydroxypropylacrylate/methylmethacrylate] copolymer of Formula 20. Yield: 82%.

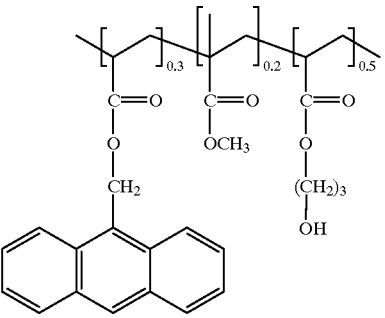

20

EXAMPLE IX

Synthesis of poly[9-anthracenemethylacrylate/4-hydroxybutylacrylate/methylmethacrylate] copolymer To a 500 ml round-bottom flask was added 0.3 mole of 9-anthracenemethylacrylate, 0.5 mole of 4-hydroxybutylacrylate, 0.2 mole of methylmethacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylacrylate/4-hydroxybutylacrylate/methylmethacrylate] copolymer of Formula 21. Yield: 81%.

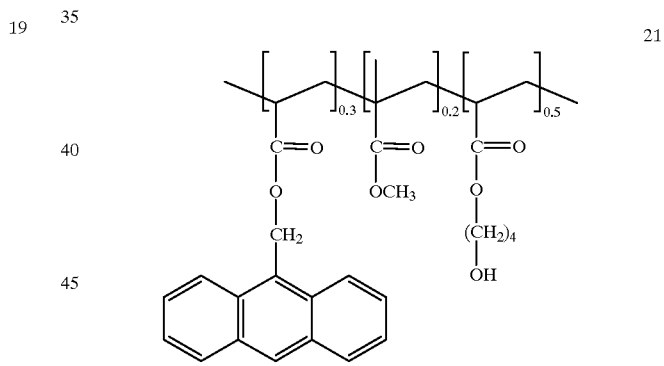

21

EXAMPLE X

Synthesis of poly[9-anthracenemethylmethacrylate/2-hydroxyethylacrylate/methylmethacrylate] copolymer To a 500 ml round-bottom flask was added 0.3 mole of 9-anthracenemethylmethacrylate, 0.5 mole of 2-hydroxyethylacrylate, 0.2 mole of methylmethacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylmethacrylate/2-hydroxyethylacrylate/methylmethacrylate] copolymer of Formula 22. Yield: 82%.

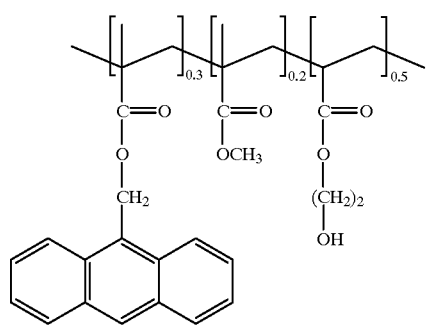

22

EXAMPLE XI

Synthesis of poly[9-anthracenemethylmethacrylate/3-hydroxypropylacrylate/methylmethacrylate] copolymer To a 500 ml round-bottom flask was added 0.3 mole of 9-anthracenemethylmethacrylate, 0.5 mole of 3-hydroxypropylacrylate, 0.2 mole of methylmethacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylmethacrylate/3-hydroxypropylacrylate/methylmethacrylate] copolymer of Formula 23. Yield: 81%.

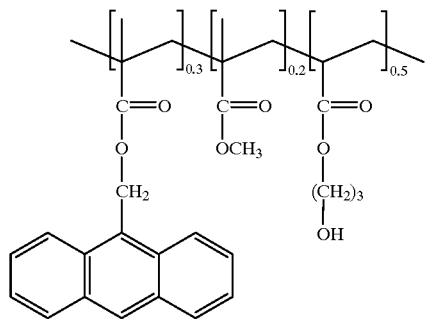

23

EXAMPLE XII

Synthesis of poly[9-anthracenemethylmethacrylate/4-hydroxybutylacrylate/methylmethacrylate] copolymer To a 500 ml round-bottom flask was added 0.3 mole of 9-anthracenemethylmethacrylate, 0.5 mole of 4-hydroxybutylacrylate, 0.2 mole of methylmethacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthracenemethylmethacrylate/4-hydroxybutylacrylate/methylmethacrylate] copolymer of Formula 24. Yield: 80%.

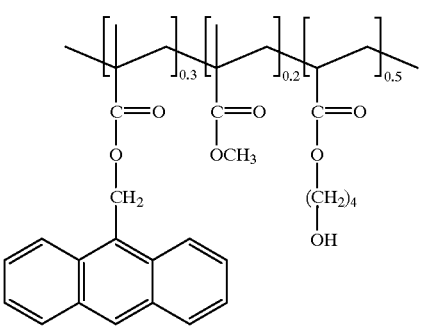

24

EXAMPLE XIII

Synthesis of poly[9-anthraceneethylacrylate 2-hydroxyethylacrylate] copolymer

Synthesis of 9-Anthraceneethylacrylate

To a solution of THF was added 0.5 mole of 9-anthracene ethanol, 0.5 mole of pyridine, and 0.5 mole of acryloyl chloride. After completion of the reaction, the product was filtered, dissolved in ethyl acetate, washed with water, and concentrated by distillation under vacuum to give 9-anthraceneethylacrylate of Formula 25. Yield 80%.

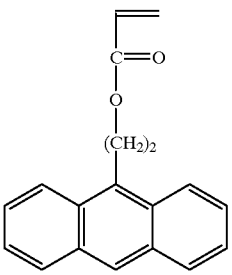

25

Synthesis of poly[9-anthraceneethylacrylate/2-hydroxyethylacrylate] copolymer

To a 500 ml round-bottom flask was added 0.5 mole of 9-anthraceneethylacrylate, 0.5 mole of 2-hydroxyethylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthraceneethylacrylate/2-hydroxyethylacrylate] copolymer of Formula 26. Yield: 82%.

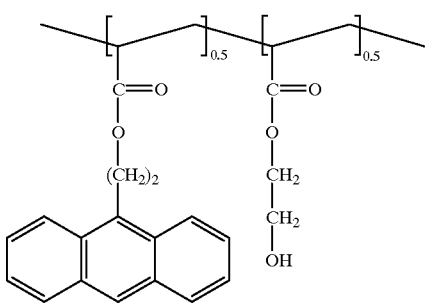

26

EXAMPLE XIV

Synthesis of poly[9-anthraceneethylacrylate/3-hydroxypropylacrylate] copolymer

To a 500 ml round-bottom flask was added 0.5 mole of 9-anthraceneethylacrylate, 0.5 mole of 3-hydroxypropylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthraceneethylacrylate/3-hydroxypropylacrylate] copolymer of Formula 27. Yield: 81%.

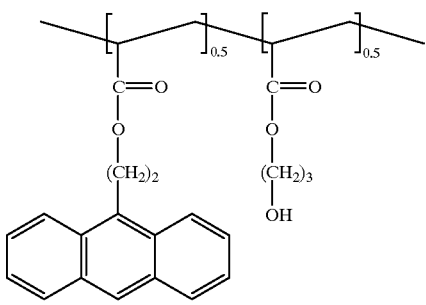

27

EXAMPLE XV

Synthesis of poly[9-anthraceneethylacrylate/4-hydroxybutylacrylate] copolymer

To a 500 ml round-bottom flask was added 0.5 mole of 9-anthraceneethylacrylate, 0.5 mole of 4-hydroxybutylacrylate, 300 g of THF, and 0.1–3 g of AIBN. The resulting solution was stirred at 60–75° C. for 5–20 hours under nitrogen atmosphere. The reaction mixture was precipitated in ethyl ether or n-hexane. The precipitate was filtered and dried to provide poly[9-anthraceneethylacrylate/4-hydroxybutylacrylate] copolymer of Formula 28. Yield: 80%

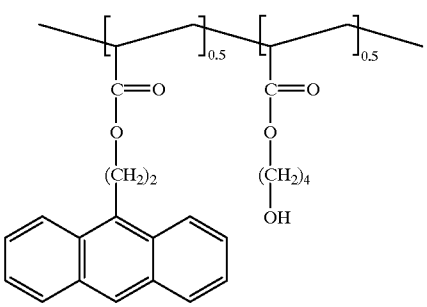

28

EXAMPLE XVI

Synthesis of poly[acroleindimethylacetal] resin

To a 500 ml round-bottom flask was added 100 g of acrolein, 66 g of THF and 2 g of AIBN. The resulting solution was stirred at 65° C. for 5 hours under vacuum. The resulting white precipitate (i.e., polyacrolein) was filtered and washed with ethyl ether. The yield of polyacrolein was 80%.

To a 1000 ml round-bottom flask was added 80 g of the white solid, 500 g of methanol, and 1 ml of trifluoromethyl sulfonic acid. The resulting solution was stirred at room temperature for 24 hours or longer. The white solid dissolved gradually as the reaction proceeded. The progress of the reaction was monitored using an IR spectrophotometer. When substantially all of the absorption band at 1690 cm$^{-1}$ disappeared in the IR spectrum, the reaction was neutralized by addition of triethylamine. Excess methanol was removed by distillation and the resulting viscous residue was precipitated in water and dried in vacuo to afford polymer of Formula 4.

Yield:65%. Molecular weight: 6,820. Polydispersity: 1.60.

$^1$H NMR δ: 1.2–2.1 (3H), 3.0–3.8 (6H), 3.8–4.7 (1H)

EXAMPLE XVII

Synthesis of poly[acroleindiethylacetal] resin

To a 500 ml round-bottom flask was added 100 g of acrolein, 66 g of THF, and 2 g of AIBN. The resulting solution was stirred at 65° C. for 5 hours under vacuum. The white precipitate which formed (i.e., polyacrolein) was filtered and washed with ethyl ether. The yield of poly (acrolein) was 80%.

To a 1000 ml round-bottom flask was added 80 g of the white solid, 500 g of ethanol, and 1 ml of trifluoromethyl sulfonic acid. The resulting solution was stirred at room temperature for 24 hours or longer. The white solid gradually dissolved as the reaction proceeded. The progress of the reaction was monitored using an IR spectrophotometer. When substantially all of the absorption band at 1690 cm$^{-1}$ disappeared in the IR spectrum, the reaction mixture was neutralized by adding triethylamine. Excess ethanol was removed by distillation and the resulting viscous residue was precipitated in water and dried in vacuo to afford the compound of Formula 5.

Yield: 60%. Molecular weight: 7,010. Polydispersity: 1.78.

$^1$H NMR (δ):1.2–2.1 (9H), 3.0–3.8 (4H), 3.8–4.7 (1H)

EXAMPLE XVIII

Synthesis of poly[methacroleindimethylacetal] resin

To a 500 ml round-bottom flask was added 100 g of methacrolein, 66 g of THF, and 2 g of AIBN. The resulting mixture was stirred at 65° C. for 5 hours under vacuum. The white precipitate which formed (i.e., polymethacrolein) was filtered and washed with ethyl ether.

To a 1000 ml round-bottom flask was added 80 g of the white solid, 500 g of methanol, and 1 ml of trifluoromethyl sulfonic acid. The resulting solution was stirred at room temperature for 24 hours or longer. The white solid gradually dissolved as the reaction proceeded. The progress of the reaction was monitored using an IR spectrophotometer. When substantially all of the absorption band at 1690 cm$^{-1}$ disappeared in the IR spectrum, the reaction mixture was neutralized by adding triethylamine. Excess methanol was removed by distillation, and the resulting viscous residue was precipitated in water and dried in vacuo to afford the compound of Formula 6.

Yield: 65%. Molecular weight: 6,800. Polydispersity: 1.63.

$^1$H NMR (δ): 1.2–2.1 (5H), 3.0–3.8 (6H), 3.8–4.7 (1H)

EXAMPLE XIX

Synthesis of poly[methacroleindiethylacetal] resin

To a 500 ml round-bottom flask was added 100 g of methacrolein, 66 g of THF, and 2 g of AIBN. The resulting solution was stirred at 65° C. for 5 hours under vacuum. The white precipitate which formed (i.e., polymethacrolein) was filtered and washed with ethyl ether.

To a 1000 ml round-bottom flask was added 80 g of the white solid, 500 g of ethanol, and 1 ml of trifluoromethyl sulfonic acid. The resulting solution was stirred at room temperature for 24 hours or longer. The white solid gradually dissolved as the reaction proceeded. The progress of the reaction was monitored using an IR spectrophotometer. When substantially all of the absorption band at 1690 cm$^{-1}$ disappeared in the IR spectrum, the reaction mixture was neutralized by adding triethylamine. Excess ethanol was removed by distillation, and the resulting viscous residue was precipitated in water and dried in vacuo to afford the compound of Formula 7.

Yield: 61%. Molecular weight: 7,200. Polydispersity: 2.0.

$^1$H NMR (δ): 1.2–2.1 (11H), 3.0–3.8 (4H), 3.8–4.7 (1H)

EXAMPLE XX

Preparation of ARC

A polymer prepared in any of Examples I to XV and a polymer prepared in any of Examples XVI to XIX were dissolved in propyleneglycol methylether acetate (PGMEA). This solution, alone or in combination with 0.1–30% by weight of at least one additive selected from the anthracene additive group, was filtered, coated on a wafer, and hard-baked at 100–300° C. for 10–1,000 sec to form an ARC. A photosensitive material (i.e., photoresist composition) can be applied on the ARC and imaged to form an ultrafine pattern using a submicrolithographic process.

ARCs of the present invention are useful in forming an ultrafine pattern on a substrate using a submicrolithographic process, for example, using KrF (248 nm), ArF (193 nm), or F$_2$ (157 nm) laser as a light source. In particular, ARCs of the present invention allow formation of stable ultrafine patterns that are suitable for 64M, 256M, 1 G, 4 G and 16 G DRAM semiconductor devices and greatly improves the production yield of these devices.

The present invention has been described in an illustrative manner, and it is to be understood the terminology used is intended to be in the nature of description rather than of limitation. Many modifications and variations of the present invention are possible in light of the above teachings. Therefore, it is to be understood that within the scope of the appended claims, the invention can be practiced otherwise than as specifically described.

What is claimed is:

1. A poly(acetal) polymer of the formula:

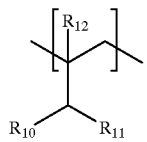

wherein $R_{10}$ and $R_{11}$ are independently $C_1$–$C_{10}$ alkoxy; and $R_{12}$ is hydrogen or alkyl.

2. The poly(acetal) polymer of claim 1, wherein $R_{12}$ is hydrogen or methyl.

3. A method for preparing a poly(acetal) polymer of the formula:

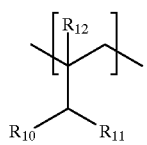

said method comprising the steps of polymerizing an acrolein monomer of the formula:

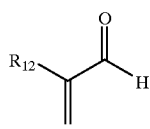

under conditions sufficient to produce a poly(acrolein) polymer of the formula:

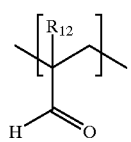

contacting said poly(acrolein) polymer with an alcohol of the formula $R_{10}$—OH and $R_{11}$—OH under conditions sufficient to produce said poly(acetal) polymer, wherein $R_{10}$ and $R_{11}$ are independently optionally substituted $C_1-C_{10}$ alkoxy; and $R_{12}$ is hydrogen or alkyl.

4. The method of claim 3, wherein a polymerization initiator is added to said acrolein monomer prior to said polymerization step.

5. The method of claim 4, wherein said polymerization initiator is selected from the group consisting of AIBN, benzoylperoxide, acetylperoxide, laurylperoxide, t-butylperacetate, t-butylhydroperoxide, and di-t-butylperoxide.

6. The method of claim 3, wherein said polymerization step is conducted in an organic solvent.

7. The method of claim 6, wherein said organic solvent is selected from the group consisting of tetrahydrofuran (THF), cyclohexanone, dimethylformamide, dimethylsulfoxide, dioxane, methylethyl ketone, benzene, toluene, xylene and mixtures thereof.

8. The method of claim 3, wherein said polymerization step comprises heating said acrolein monomer to temperature in the range of from about 60° C. to about 70° C.

9. The method of claim 8, wherein said acrolein monomer is heated for a period of from about 4 h to about 6 h.

10. The method of claim 3, wherein $R_{12}$ is hydrogen or methyl.

11. An anti-reflective coating composition comprising a poly(acetal) polymer of the formula:

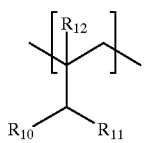

wherein $R_{10}$ and $R_{11}$ are independently $C_1-C_{10}$ alkoxy; and $R_{12}$ is hydrogen or alkyl.

12. An anti-reflective coating composition comprising a cross-linked polymer produced from cross-linking a poly(acetal) polymer of the formula:

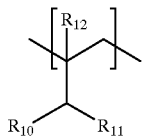

with a polymer comprising a hydroxy functional group, wherein $R_{10}$ and $R_{11}$ are independently optionally substituted $C_1-C_{10}$ alkoxy; and $R_{12}$ is hydrogen or alkyl.

13. The anti-reflective coating composition of claim 12, wherein said polymer comprising a hydroxy functional group is of the formula:

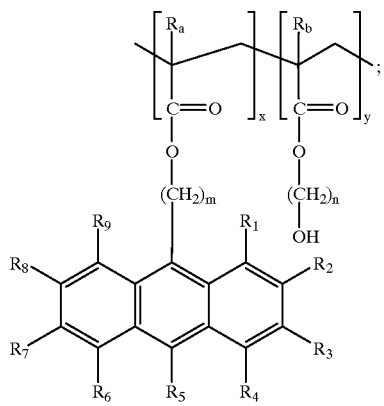

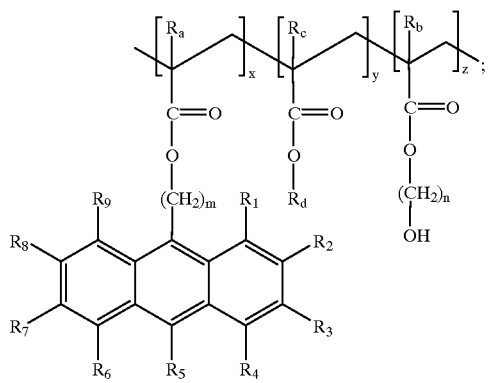

or mixtures thereof, wherein each of $R_a$, $R_b$, and $R_c$ is independently hydrogen or optionally substituted $C_1-C_{10}$ alkyl;

$R_d$ is optionally substituted $C_1-C_{10}$ alkyl;

each of $R_1$ to $R_9$ is independently hydrogen, optionally substituted $C_1-C_5$ alkyl, or optionally substituted $C_1-C_5$ alkoxyalkyl;

x, y and z are mole fractions, each of which is independently in the range of from 0.01 to 0.99;

each of m and n is independently an integer of 1 to 5.

14. The anti-reflective coating composition of claim 13, wherein each of $R_{12}$, $R_a$, $R_b$, and $R_c$ is independently hydrogen or methyl.

15. The anti-reflective coating composition of claim 12, further comprising an additive selected from the group consisting of anthracene, 9-anthracenemethanol, 9-anthracenecarbonitrile, 9-anthracenecarboxylic acid, dithranol, 1,2,10-anthracenetriol, anthraflavonic acid, 9-anthraldehydeoxime, 9-anthraldehyde, 2-amino-7-methyl-5-oxo-5H-[1]benzopyrono[2,3-b]benzopyridine-3-carbonitrile, 1-aminoanthraquinone, anthraquinone-2-carboxylic acid, 1,5-dihydroxyanthraquinone, anthrone, 9-anthryltrifluoromethyl ketone, a 9-alkylanthracene derivative of the formula:

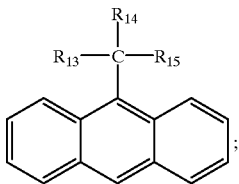

a carboxylanthracene derivative of the formula:

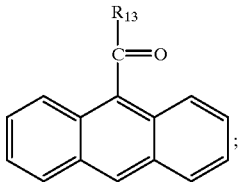

a carboxylanthracene derivative of the formula:

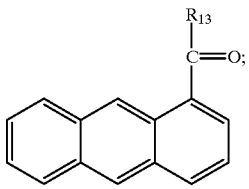

and mixtures thereof, wherein
each of $R_{13}$, $R_{14}$, and $R_{15}$ is independently hydrogen, hydroxy, optionally substituted $C_1$–$C_5$ alkyl, or optionally substituted $C_1$–$C_5$ alkoxyalkyl.

16. The anti-reflective coating composition of claim 12 further comprising an organic solvent.

17. The anti-reflective coating composition of claim 16, wherein said organic solvent is selected from the group consisting of ethyl 3-ethoxypropionate, methyl 3-methoxypropionate, cyclohexanone, and propylene glycol methyletheracetate.

18. The anti-reflective coating composition of claim 16, wherein the amount of said organic solvent is from about 200 to about 5,000% by weight of the total weight of said cross-linked polymer.

19. A method for producing an ARC coated substrate comprising the steps of:
   (a) coating an anti-reflective coating composition comprising a mixture of polymers on a substrate, wherein said mixture of polymers comprises:
      (i) a poly(acetal) polymer of the formula:

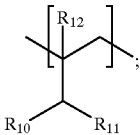

wherein
      $R_{10}$ and $R_{11}$ are independently optionally substituted $C_1$–$C_{10}$ alkoxy; and
      $R_{12}$ is hydrogen or alkyl; and
      (ii) a polymer comprising a hydroxy functional group of the formula:

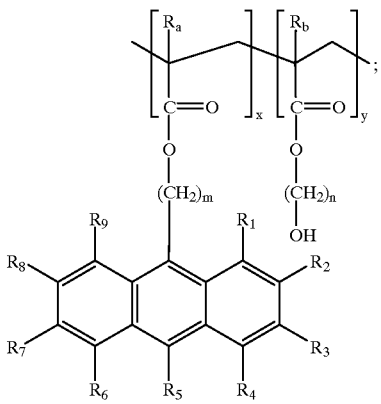

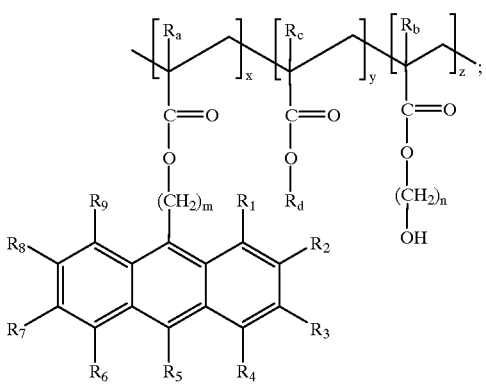

or mixtures thereof, wherein
   each of $R_a$, $R_b$, and $R_c$ is independently hydrogen or optionally substituted $C_1$–$C_{10}$ alkyl;
   $R_d$ is optionally substituted $C_1$–$C_{10}$ alkyl;
   each of $R_1$ to $R_9$ is independently hydrogen, optionally substituted $C_1$–$C_5$ alkyl, or optionally substituted $C_1$–$C_5$ alkoxyalkyl;
   x, y and z are mole fractions, each of which is independently in the range of from 0.01 to 0.99;
   each of m and n is independently an integer of 1 to 5; and
   (b) heating said coated substrate to produce an ARC coated substrate.

20. The method of claim 19, wherein said heating step comprises heating said coated substrate to temperature in the range of from about 100° C. to about 300° C. for a period of from about 10 sec to about 1,000 sec.

21. A semiconductor device produced by the method of claim 19.

* * * * *